United States Patent
Berke et al.

(10) Patent No.: US 9,647,852 B2
(45) Date of Patent: May 9, 2017

(54) SELECTIVE SINGLE-ENDED TRANSMISSION FOR HIGH SPEED SERIAL LINKS

(71) Applicant: Dell Products, L.P., Round Rock, TX (US)

(72) Inventors: Stuart A. Berke, Austin, TX (US); Bhyrav M. Mutnury, Round Rock, TX (US)

(73) Assignee: DELL PRODUCTS, L.P., Round Rock, TX (US)

(*) Notice: Subject to any disclaimer, the term of this patent is extended or adjusted under 35 U.S.C. 154(b) by 68 days.

(21) Appl. No.: 14/334,331

(22) Filed: Jul. 17, 2014

(65) Prior Publication Data

US 2016/0020952 A1    Jan. 21, 2016

(51) Int. Cl.
*H04B 3/00* (2006.01)
*H04L 12/40* (2006.01)

(52) U.S. Cl.
CPC ........... *H04L 12/40* (2013.01); *H04B 3/00* (2013.01)

(58) Field of Classification Search
None
See application file for complete search history.

(56) References Cited

U.S. PATENT DOCUMENTS

| | | | | |
|---|---|---|---|---|
| 6,161,157 A * | 12/2000 | Tripathi | ............ | G06F 13/4045 710/104 |
| 6,323,699 B1 * | 11/2001 | Quiet | ............ | H04L 25/0264 327/108 |
| 7,746,169 B2 * | 6/2010 | Deng | ............ | H03F 1/3205 330/253 |
| 2006/0156161 A1 * | 7/2006 | Warner | ............ | H04N 17/004 714/746 |
| 2008/0204041 A1 * | 8/2008 | Anderson | ............ | G01R 27/28 324/629 |
| 2009/0110042 A1 * | 4/2009 | Xiao | ............ | H04L 43/10 375/226 |
| 2010/0182089 A1 * | 7/2010 | Zolfaghari | ............ | G01S 19/36 330/253 |
| 2011/0075740 A1 * | 3/2011 | Ferraiolo | ............ | H04L 25/0272 375/257 |
| 2011/0142165 A1 * | 6/2011 | Gao | ............ | H04L 1/003 375/296 |
| 2011/0150137 A1 * | 6/2011 | Lin | ............ | G06F 13/38 375/316 |
| 2014/0225675 A1 * | 8/2014 | Kaukovuori | ............ | H03F 3/195 330/307 |

FOREIGN PATENT DOCUMENTS

WO    WO 2008039503 A2 *    4/2008    ............ H03F 1/26

* cited by examiner

*Primary Examiner* — Ayaz Sheikh
*Assistant Examiner* — Tarell Hampton
(74) *Attorney, Agent, or Firm* — Fogarty LLP

(57) ABSTRACT

Embodiments of systems and methods for selective single-ended transmission for high speed serial links. In an embodiment, a method includes training a data link in a differential mode. The method may also include training the data link in a single-ended mode. Additionally, the method may include dynamically operating the data link in the single-ended mode or the differential mode according to a monitored performance characteristic of the data link.

20 Claims, 5 Drawing Sheets

SELECTIVE SINGLE-ENDED TRANSMISSION FOR HIGH SPEED SERIAL LINKS

FIELD

This disclosure relates generally to computer systems, and more specifically, to selective single-ended transmission for high speed serial links.

BACKGROUND

In general, Information Handling Systems (IHS) include a processing device, a memory device for storing computer code that, when executed by the processor, causes the IHS to perform various operations on data and a data storage device for storing the data. Components of the IHS are generally connected by data links, such as data buses or other data connections. Often, the data links include one or more pairs of conductors, which are typically configured to operate in a differential mode. One form of a data link is a High Speed Serial (HSS) link.

As demand for memory, fabric, and IO Bandwidth in an IHS increases, the number of data links in an IHS increases. For example, a typical 2014 IHS platform may have 40 pairs of QPI (Intel Corporation QuickPath Interconnect®) fabric, 80 pairs of Peripheral Component Interface Express (PCIe) gen3, and 24 or more Serial Attached SCSI (SAS) pairs. Looking forward to 2016-2018, the types, number and speed of the pairs will increase dramatically. At higher and higher frequencies, due to transmission medium losses, the power required to drive and receive the differential signals across cost-effective PCBs and cables goes up exponentially.

Transmitter (Tx) and Receiver (Rx) equalization is commonly used to ensure that high speed Serializer/Deserializer (SerDes) interfaces work error free, or at acceptably low Bit Error Rates (BER), depending on the link requirements. Receiver equalization coefficients, such as Decision Feedback Equalization (DFE), Variable Gain Amplifier (VGA) and Analog Equalization (AEQ) are effective techniques for enhancing performance. However, using these advance techniques, the transmission power of Input/Output (I/O) devices can dominate the logic/core power consumption in many devices such as PCIe or SAS switches and other I/O controllers. I/O power may be up to 70% of total chip power consumption.

High speed SerDes or Serial links have historically been differential in nature due to the advantages of differential signaling. These advantages include noise immunity, low voltage swing and provide continuous current return path. But, differential signaling also consumes twice the power and nearly twice the channel routing real estate.

SUMMARY

Embodiments of systems and methods for selective single-ended transmission for high speed serial links. In an embodiment, a method includes training a data link in a differential mode. The method may also include training the data link in a single-ended mode. Additionally, the method may include dynamically operating the data link in the single-ended mode or the differential mode according to a monitored performance characteristic of the data link.

In an embodiment, training the data link in a single-ended mode includes training the data link in a first single-ended mode over a first conductor of a differential pair, and training the data link in a second single-ended mode over a second conductor of the differential pair. In such an embodiment, dynamically operating the data link further may include selectively operating the data link in the first single-ended mode or the second single-ended mode according to the monitored performance characteristic of the data link. Additionally, such embodiments may include disabling a transmission component associated with the second conductor in response to the data link being operated in the first single-ended mode, and disabling a transmission component associated with the first conductor in response to a determination that the data link is being operated in the second single-ended mode.

In an embodiment, the method may include monitoring the performance characteristic of the data link during operation. Such embodiments may include dynamically switching from the single-ended mode to the differential mode in response to a determination that the performance characteristic of the data link is outside of a predetermined range of acceptable values.

In an embodiment, the method further includes monitoring the performance characteristic of the data link during operation, and dynamically switching from the first single-ended mode to the second single-ended mode in response to a determination that the performance characteristic of the data link is outside of a predetermined range of acceptable values.

Embodiments of an apparatus for selective single-ended transmission for high speed serial links are presented. In an embodiment, an apparatus may include a data link having a transmitter circuit and a receiver circuit, the transmitter circuit and the receiver circuit being connected by a differential pair of conductors. Additionally, the apparatus may include a data link controller configured to train the data link in a differential mode, train the data link in a single-ended mode, and dynamically operate the data link in the single-ended mode or the differential mode according to a monitored performance characteristic of the data link.

An Information Handling System (IHS) is also presented, where the IHS includes a plurality of high speed serial (HSS) data links, each HSS data link comprising a transmitter circuit and a receiver circuit, the transmitter circuit and the receiver circuit being connected by a differential pair of conductors, and a data link controller. In an embodiment, the data link controller may train each HSS data link in a differential mode, train each HSS data link in a single-ended mode, and dynamically operate the HSS data links in the single-ended mode or the differential mode according to a monitored performance characteristic of the data link.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
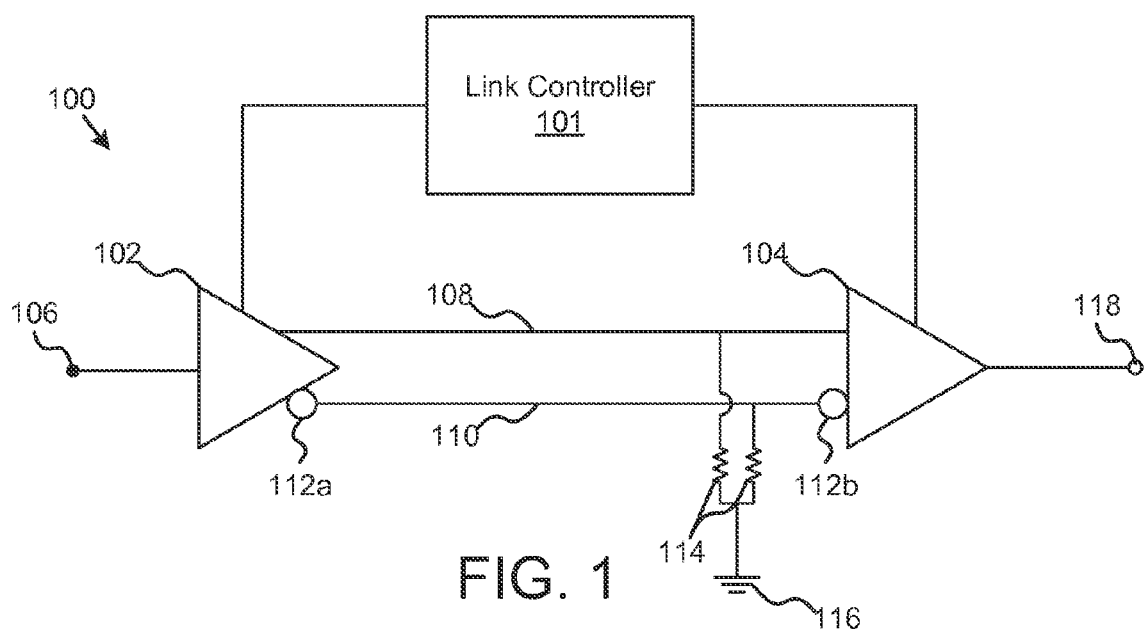
FIG. 1 is a schematic circuit diagram illustrating one embodiment of a data link.

Embodiments of methods and systems for selective single-ended transmission for high speed serial links are described. In an embodiment, a differential HSS link may be dynamically operated as a single-ended serial link, depending on the topology and robustness of the link. Advantageously, operating the HSS link dynamically as a single-ended serial link may save power and provide advanced RAS availability functionality.

Although differential signaling may be required in environments where high levels of noise, crosstalk, channel losses, and other signal distortions are present, in many cases within a server or other product, these effects are not excessive on the majority of the HSS links. In some environments, even a single conductor of the differential pair may be used to transmit and receive the signal robustly. The present embodiments describe methods and systems for systematically determining which HSS links may be operated robustly in single-ended mode, and allow operation to fallback to differential mode as necessary.

During a training phase, each HSS link may be tested as 1) a differential pair, 2) a single-ended signal with the normally paired signal disabled, and 3) a single-ended signal with the opposite normally paired signal disabled. The training phase may be implemented in hardware state machines, in firmware, in system management software, etc. In an embodiment, testing may involve sending and receiving various data patterns and determining the robustness of the channel for each of the three signaling modes. In an embodiment, robustness may be determined by one or more signal transmission characteristics, such as whether the link has achieved error-free operation, or meets a predetermined BER (Bit Error Rate) threshold. In an embodiment, test patterns may include those that cover worst-case crosstalk, worst-case noise, worst-case simultaneous switching, etc.

In an embodiment, if at least one of the single-ended signaling modes is found to be robust, the system configures the HSS link to single-ended operation, disabling the transmitter and receiver I/O cells and any logic associated with the paired signal, resulting in significant power savings. In further embodiments, the signaling mode may be configured as a differential or single-ended signal independently for each link within a multi-link I/O interface, such as a x8 PCIe link, or a x20 QPI link, or any other IO or cache coherency interconnect.

An additional benefit of running a HSS link as single-ended is the additional immunity to crosstalk from the passive medium. In an embodiment, if the single-ended mode starts exhibiting an unacceptable level of errors or retries, the transmitter would dynamically switch back to differential mode, or alternatively to the other single-ended signaling path. Changing signal mode may be controlled by the transmitter itself, or via the system, based on predetermined error rate thresholds including numbers of errors within a span of time.

Mode management may be implemented in hardware, firmware, or system management entity. In an embodiment, mode management may be performed out-of-band by changing the configuration state of the Tx and Rx ends of the HSS. Alternatively, mode management may be performed in-band by having the Tx side initiate an HSS link retraining event. In an embodiment, an HSS retraining event may include surpassing a predetermined link error or retry threshold.

One additional RAS availability benefit is that the link may be operated even with only one path of the differential pair intact, allowing fault tolerance of the link in the presence of hard fault and/or discontinuity conditions either at start-up or during normal operation. In some embodiments, options include starting in differential mode and failing down to single-ended mode, or starting in single-ended mode, and failing over to single-ended mode on the other half of the differential pair.

FIG. 1 is a schematic circuit diagram illustrating one embodiment of a data link 100. In an embodiment, the data link 100 may be configured to operate in a differential mode where a signal is transmitted on a first conductor 108 and an inverse of the signal is transmitted on a second conductor 110. The data link 100 may include a transmitter 102 and a receiver 104. The transmitter 102 and receiver 104 may be amplifiers in one embodiment. The transmitter 102 may be configured to receive an input signal 106 and to transmit a corresponding signal to the receiver 104 via at least one of the first conductor 108 and the second conductor 110. The receiver 104 may receive the signal from the conductor 108, 110 and generate a corresponding output signal on output node 118. In one embodiment, each conductor 108, 110 may be coupled to a resistor 114, which is coupled to ground 116 for establishing a termination on the conductors 108, 110. In one embodiment, the first conductor 108 is a non-inverting line and the second conductor 110 is an inverting line. In such an embodiment, the transmitter 102 may include an inverter 112a and the receiver 104 may also include an inverter 112b.

In an embodiment, the link controller 101 may be configured to train and monitor the data link 100. For example, the link controller 101 may be configured to run a test of the transmitter 102 and the receiver 104 over the first conductor 108 in single-ended mode. The link controller 101 may also be configured to test the transmitter 102 and the receiver 104 over the second conductor 110 in single-ended mode. Additionally, the link controller 101 may be configured to test the transmitter 102 and the receiver 104 over both the first conductor 108 and the second conductor 110 in differential mode. The link controller 101 may additionally be configured to determine settings for each mode and to determine a ranking or priority of each mode. The link controller 101 may then enable the data link on the first conductor 108, the second conductor 110, or both according to the detected link conditions. In a further embodiment, the link controller 101 may monitor the data link 100 to determine if configuration changes are required. Additional details of the operation of the link controller 101 are described below with relation to FIG. 3.

Figure 2:
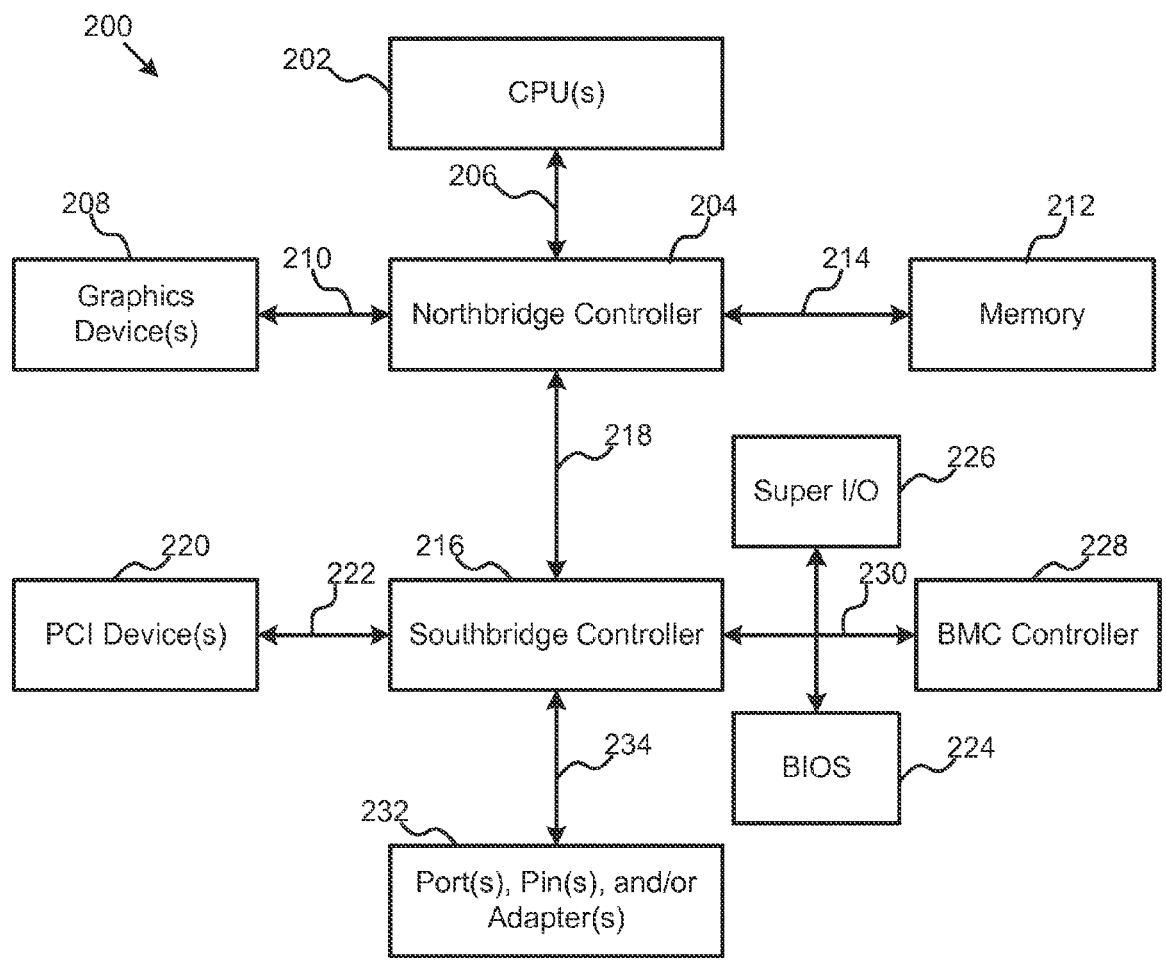
FIG. 2 is a schematic block diagram illustrating one embodiment of an IHS.

FIG. 2 is a schematic block diagram illustrating one embodiment of an IHS 200 having one or more data links that may be configured according to the data link 100 of FIG. 1.

As shown, computing device 200 includes one or more CPUs 202. In various embodiments, computing device 200 may be a single-processor system including one CPU 202, or a multi-processor system including two or more CPUs 202 (e.g., two, four, eight, or any other suitable number). CPU(s) 202 may include any processor capable of executing program instructions. For example, in various embodiments, CPU(s) 202 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of CPU(s) 202 may commonly, but not necessarily, implement the same ISA.

CPU(s) 202 are coupled to northbridge controller or chipset 204 via front-side bus 206. The front-side bus 206 may include one or more data links 100 as illustrated in FIG. 1. In most embodiments, the front-side bus 206 will include multiple data links 100 arranged in a set or bus configuration. Northbridge controller 204 may be configured to coordinate I/O traffic between CPU(s) 202 and other components. For example, in this particular implementation, northbridge controller 204 is coupled to graphics device(s) 208 (e.g., one or more video cards or adaptors, etc.) via graphics bus 210 (e.g., an Accelerated Graphics Port or AGP bus, a Peripheral Component Interconnect or PCI bus, etc.). Northbridge controller 204 is also coupled to system memory 212 via memory bus 214. The system memory bus 214 may also include one or more data links 100 as illustrated in FIG. 1. Memory 212 may be configured to store program instructions and/or data accessible by CPU(s) 202. In various embodiments, memory 212 may be implemented using any suitable memory technology, such as static RAM (SRAM), synchronous dynamic RAM (SDRAM), nonvolatile/Flash-type memory, or any other type of memory.

Northbridge controller 204 is coupled to southbridge controller or chipset 216 via internal bus 218. In an embodiment, the internal bus 218 may include one or more data links 100 as illustrated in FIG. 1. Generally, southbridge controller 216 may be configured to handle various of computing device 200's I/O operations, and it may provide interfaces such as, for instance, Universal Serial Bus (USB), audio, serial, parallel, Ethernet, etc., via port(s), pin(s), and/or adapter(s) 232 over bus 234. For example, southbridge controller 216 may be configured to allow data to be exchanged between computing device 200 and other devices, such as other IHSs attached to a network. In various embodiments, southbridge controller 216 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 216 may also enable connection to one or more keyboards, keypads, touch screens, scanning devices, voice or optical recognition devices, or any other devices suitable for entering or retrieving data. Multiple I/O devices may be present in computing device 200. In some embodiments, I/O devices may be separate from computing device 200 and may interact with computing device 200 through a wired or wireless connection. As shown, southbridge controller 216 is further coupled to one or more PCI devices 220 (e.g., modems, network cards, sound cards, video cards, etc.) via PCI bus 222. In an embodiment, the PCI bus 222 may include one or more data links 100 as illustrated in FIG. 1. Southbridge controller 216 is also coupled to Basic I/O System (BIOS) 224, Super I/O Controller 226, and Baseboard Management Controller (BMC) 228 via Low Pin Count (LPC) bus 230. In an embodiment, the LPC bus 230 may include one or more data links 100 as illustrated in FIG. 1.

BIOS 224 includes non-volatile memory having program instructions stored thereon. Those instructions may be usable CPU(s) 202 to initialize and test other hardware components and/or to load an Operating System (OS) onto computing device 200. As such, BIOS 224 may include a firmware interface that allows CPU(s) 202 to load and execute certain firmware, as described in more detail below. In some cases, such firmware may include program code that is compatible with the Unified Extensible Firmware Interface (UEFI) specification, although other types of firmware may be used.

In an embodiment, the data link controller 101 may be implemented in the BIOS 224. For example, the BIOS 224 may include firmware or software components configured to train and monitor the various data links 100, which may comprise front-side bus 206, graphics bus 210, system memory bus 214, internal bus 218, PCI bus 222, LPC bus 230, and other internal or external interface busses included in computer system 200. Further embodiments of the data link controller 101 are described with relation to FIG. 3. One of ordinary skill will comprehend the specific details of implementation of the data link controller 101 in the BIOS 224 without undue experimentation.

BMC controller 228 may include non-volatile memory having program instructions stored thereon that are usable by CPU(s) 202 to enable remote management of computing device 200. For example, BMC controller 228 may enable a user to discover, configure, and manage BMC controller 228, setup configuration options, resolve and administer hardware or software problems, etc. Additionally or alternatively, BMC controller 228 may include one or more firmware volumes, each volume having one or more firmware files used by the BIOS' firmware interface to initialize and test components of computing device 200.

Super I/O Controller 226 combines interfaces for a variety of lower bandwidth or low data rate devices. Those devices may include, for example, floppy disks, parallel ports, keyboard and mouse, temperature sensor and fan speed monitoring, etc. For example, the super I/O controller 226 may be coupled to the one or more upstream sensors 206 and to the one or more downstream sensors 208.

In some cases, computing device 200 may be configured to access different types of computer-accessible media separate from memory 212. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to computing device 200 via northbridge controller 204 and/or southbridge controller 216.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that computing device 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 204 may be combined with southbridge controller 216, and/or be at least partially incorporated into CPU(s) 202. In other implementations, one or more of the devices or components shown in FIG. 2 may be absent, or one or more other components may be added. Accordingly, systems and methods described herein may be implemented or executed with other computer system configurations. In some cases, various elements shown in FIG. 2 may be mounted on a motherboard and protected by a chassis or the like.

Figure 3:
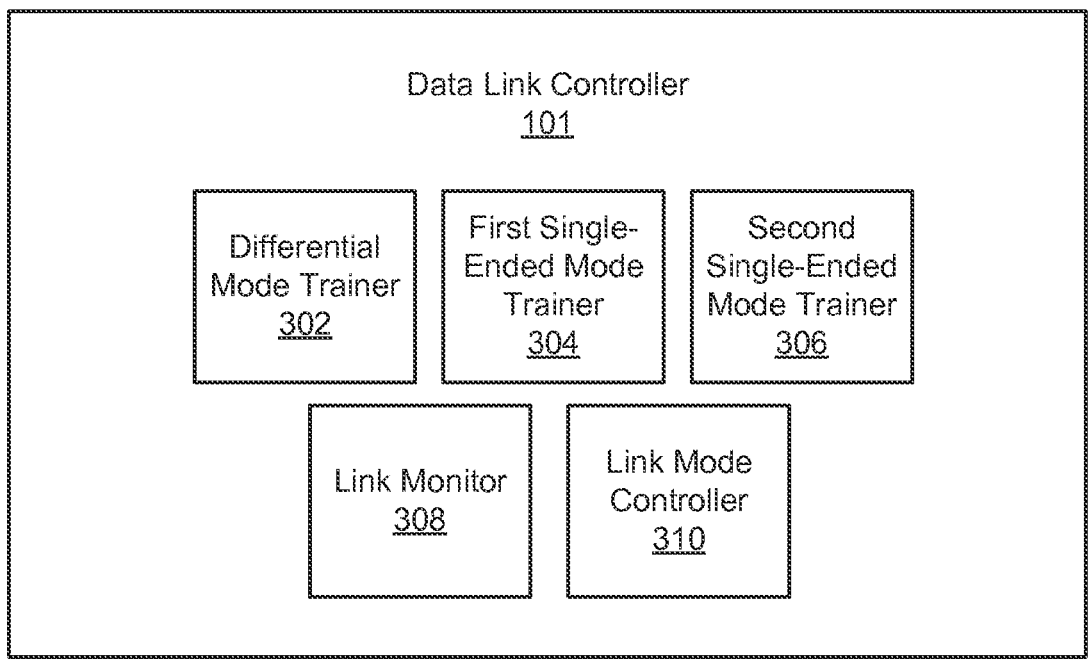
FIG. 3 is a schematic block diagram illustrating one embodiment of an apparatus for selective single-ended transmission for high speed serial links.

FIG. 3 is a schematic block diagram illustrating one embodiment of an apparatus for selective single-ended transmission for high speed serial links. In an embodiment, the apparatus is a data link controller 101. The data link controller 101 may be implemented in hardware, firmware, system software, or any combination thereof. In a further embodiment, the data link controller 101 may be implemented in the BIOS 224 of a computer system 200.

In an embodiment, the data link controller 101 may include various units for dynamically operating the data links 100 in the computer system 200. The units may include, for example, a differential mode trainer 302, a first single-ended mode trainer 304, a second single-ended mode trainer 306, a link monitor 308, and a link mode controller 310. One of ordinary skill in the art will recognize additional units which may be included in the data link controller 101 to perform one or more of the operations described with reference to FIGS. 4-5.

In an embodiment, the differential mode trainer 302 may test data link in differential mode, meaning that a test pattern is transmitted from the transmitter 102 to the receiver 104 over the first conductor 108 and the inverse of the test pattern is transmitted over the second conductor 110 simultaneously. In an embodiment, the differential mode trainer 302 may determine a BER for the differential data link. In a further embodiment, the differential mode trainer 302 may determine a set of optimization parameters for operation of the data link in differential mode based on the results of the test. Examples of optimization parameters may include power or attenuation settings, line impedance matching settings, filter settings, etc. One of ordinary skill will recognize a variety of optimization parameters which may be determined by the differential mode trainer 302.

In an embodiment the first single-ended mode trainer 304 may similarly train the data link 100 using only the first conductor 108, with the data connection over the second conductor 110 shut off. In an embodiment, the first single-ended mode trainer 304 may also test the data link over the first conductor 108 by sending a test pattern from the transmitter 102 to the receiver 104 over the first conductor 108. The first single-ended mode trainer 304 may determine a BER for the data link over the first conductor 108. The first single-ended mode trainer 304 may further determine a set of optimization parameters for use when the data link 100 is in single-ended mode on the first conductor 108.

In an embodiment the second single-ended mode trainer 306 may similarly train the data link 100 using only the second conductor 110, with the data connection over the first conductor 108 shut off. In an embodiment, the first single-ended mode trainer 306 may also test the data link over the second conductor 110 by sending a test pattern from the transmitter 102 to the receiver 104 over the second conductor 110. The second single-ended mode trainer 306 may determine a BER for the data link over the second conductor 110. The second single-ended mode trainer 306 may further determine a set of optimization parameters for use when the data link 100 is in single-ended mode on the second conductor 110.

In one embodiment, the link mode controller 310 may select a mode of operation for the data link 100 in response to the training results determined by the differential mode training 302, the first single-ended mode trainer 304 and the second single-ended mode trainer 306. The link mode controller 310 may select a differential mode of operation, or a single-ended mode of operation. In a further embodiment, the link mode controller 310 may select a first single-ended mode configured to transmit data over the first conductor 108 with the second conductor switched off, or a second single-ended mode configured to transmit data over the second conductor 110, with the first conductor switched off. In an embodiment, the link mode controller 310 may select the mode of operation based on one or more predefined selection criteria. For example, a selection criteria may include a lowest power required to operate the data link. Another selection criteria may include a BER under a predetermined threshold value. One of ordinary skill will recognize additional selection criteria, such as a jitter value under a predetermined threshold value, etc.

Once the data link 100 is initially established according to the mode selected by the link mode controller 310, the link monitor 308 may monitor link performance during operation. For example, the link monitor 308 may monitor link characteristics such as total errors, BER, jitter values, etc. Generally, the link monitor 308 may monitor the robustness of the data link 100 in the selected mode of operation. If the data link is operating in the first single-ended mode over the first conductor 108, but the data link 100 suffers an unacceptable performance degradation, then the link mode controller 310 may switch to a different mode of operation. For example, the link mode controller 310 may switch to the second single-ended mode over the second conductor 110. Alternatively, the link mode controller 310 may switch to differential mode. The reverse operation of switching from the second differential mode to the first differential mode may also be performed in response to a determination that the second differential link 110 is experiencing performance issues.

Figure 4:
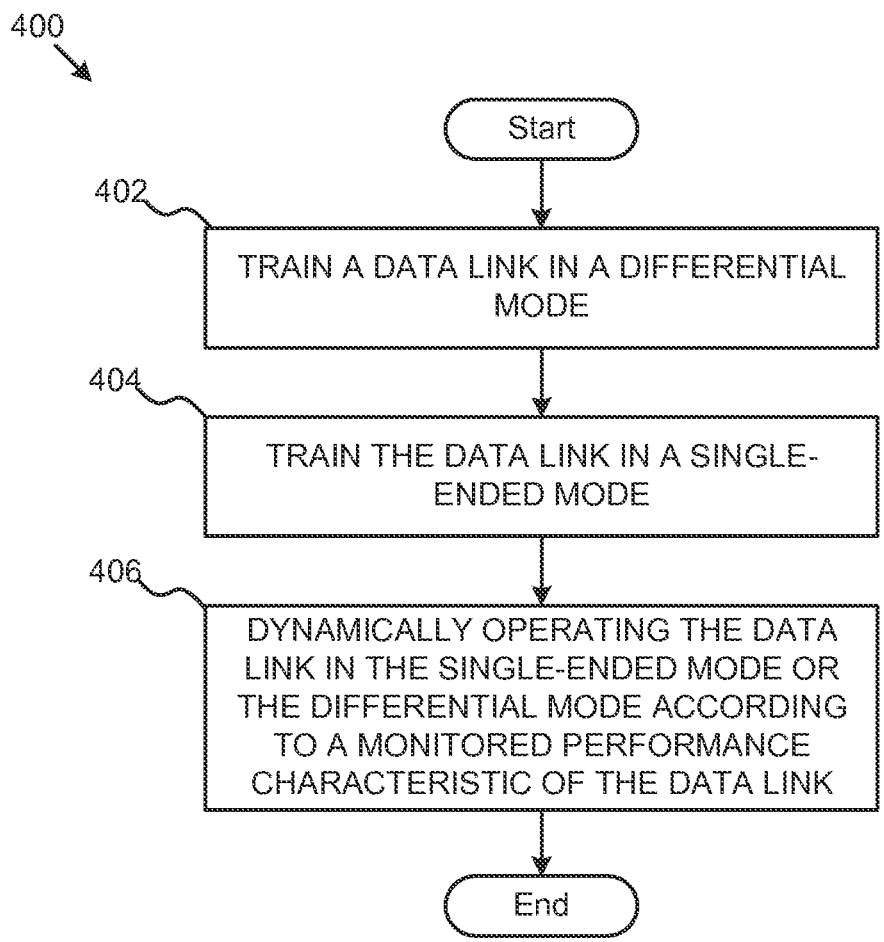
FIG. 4 is a schematic flowchart diagram illustrating one embodiment of a method for selective single-ended transmission for high speed serial links.

FIG. 4 is a schematic flowchart diagram illustrating one embodiment of a method 400 for selective single-ended transmission for high speed serial links. In an embodiment, the method 400 starts at block 402, where the data link controller 101 trains the data link 100 in a differential mode. At block 404, the data link controller 101 trains the data link in a single-ended mode. At block 406, the data link controller dynamically operates the data link in the single-ended mode or the differential mode according to a monitored performance characteristic. For example, the monitored performance characteristic may be total errors, BER, jitter, frequency drift, etc.

Figure 5:
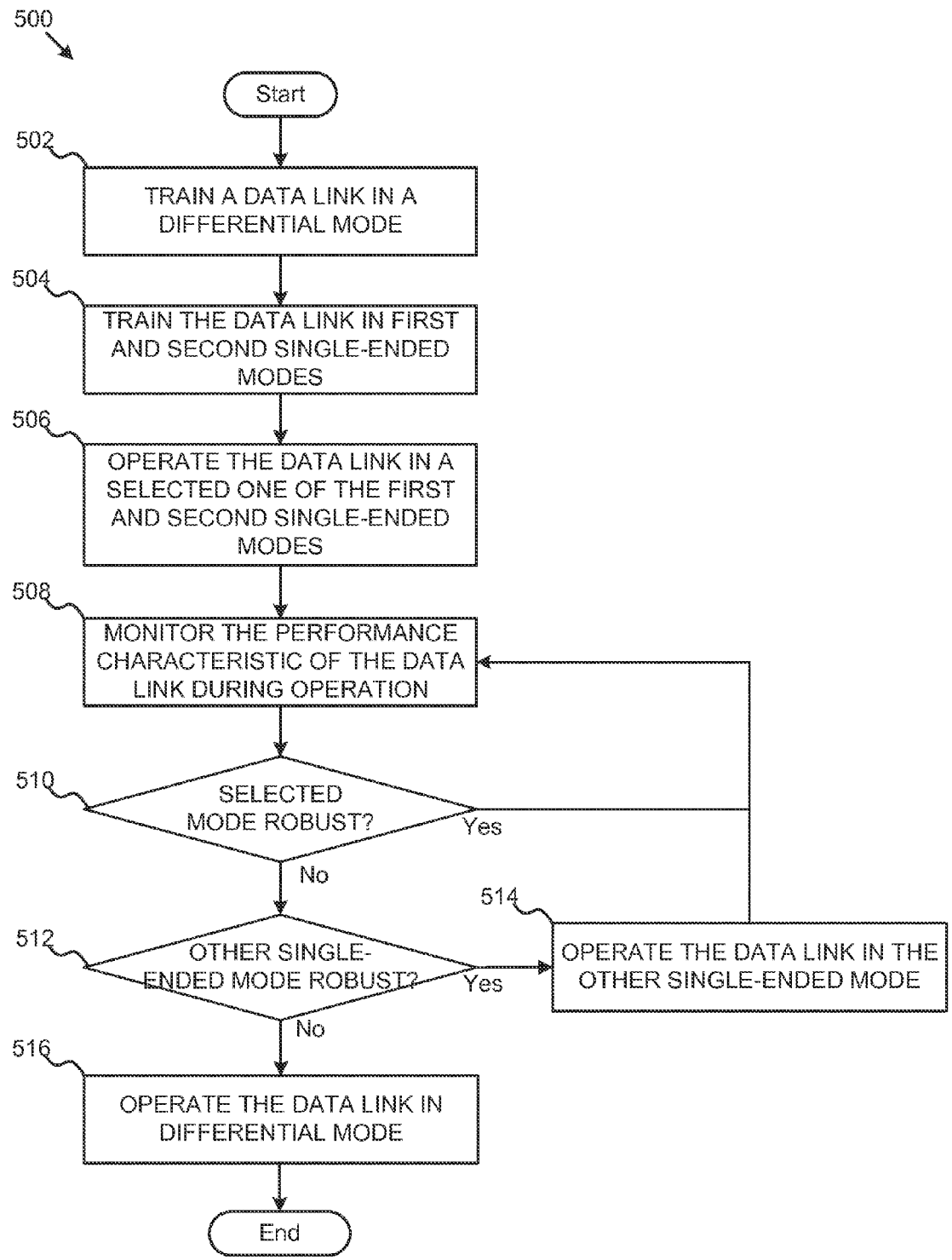
FIG. 5 is a schematic flowchart diagram illustrating an embodiment of a method for selective single-ended transmission for high speed serial links.

FIG. 5 is a schematic flowchart diagram illustrating another embodiment of a method 500 for selective single-ended transmission for high speed serial links. In an embodiment, the method 500 starts when the data link controller 101 trains the data link 100 in a differential mode as shown at block 502. At block 504, the data link controller 101 trains the data link in the first and the second single-ended modes. For example, the first single-ended mode trainer 304 may train the data link 100 in the first single-ended mode, and the second single-ended mode trainer 306 may train the data link 100 in the second single-ended mode. In an embodiment, the link mode controller 310 may operate the data link 100 in a selected one of the first and second single-ended modes as shown at block 506. At block 508, the link monitor 308 may monitor the performance characteristic of the data link 100 during operation. At block 510, it may be determined whether the selected mode is robust. If so, the link monitor 308 continues to monitor the performance characteristic of the data link 100. If not, then it may be determined at block 512 whether the other single-ended mode is robust. For example, if the first single-ended mode is selected initially, block 512 may include determining whether the second single-ended mode is robust. If so, the link mode controller 310 may operate the data link in the other single-ended mode as shown at block 514. If not, then the link mode controller 310 may operate the data link 100 in differential mode as shown at block 516.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    training a differential data link, by a Basic Input/Output System (BIOS) of an Information Handling System (IHS), in a differential mode;
    training the differential data link, by the BIOS, in a first single-ended mode;
    training the differential data link, by the BIOS, in a second single-ended mode;
    operating the differential data link in the first single-ended mode with a first set of optimization parameters;
    monitoring, by the BIOS, a performance characteristic of the differential data link in the first single-ended mode;
    after operating the differential data link in the first single-ended mode and in response to a determination by the BIOS that the performance characteristic of the differential data link in the first single-ended mode is below a threshold, operating the differential data link in the second single-ended mode with a second set of optimization parameters;
    monitoring, by the BIOS, the performance characteristic of the differential data link in the second single-ended mode; and
    after operating the differential data link in the second single-ended mode and in response to a determination by the BIOS that the performance characteristic of the differential data link in the second single-ended mode is below the threshold, operating the differential data link in the differential mode with a third set of optimization parameters.

2. The method of claim 1, wherein training the differential data link in the first and second single-ended modes further comprises:
    training, by the BIOS, the differential data link in the first single-ended mode over a first conductor of a differential pair; and
    training, by the BIOS, the differential data link in the second single-ended mode over a second conductor of the differential pair.

3. The method of claim 1, further comprising selectively operating the differential data link, by the BIOS, in the first single-ended mode or the second single-ended mode according to the monitored performance characteristic of the differential data link.

4. The method of claim 2, further comprising disabling, by the BIOS, a transmission component associated with the second conductor in response to the differential data link being operated in the first single-ended mode, and disabling, by the BIOS, a transmission component associated with the first conductor in response to a determination that the differential data link is being operated in the second single-ended mode.

5. The method of claim 1, wherein the first, second, and third optimization parameters comprise: power or attenuation settings, line impedance matching settings, and filter settings.

6. The method of claim 1, wherein the training uses a test pattern that covers worst-case crosstalk, worst-case noise, or worst-case simultaneous switching.

7. The method of claim 1, wherein the threshold indicates error-free operation.

8. An Information Handling System (IHS), comprising:
    a processor; and
    a Basic Input/Output System (BIOS) coupled to the processor, the BIOS having program instructions stored thereon that, upon execution by the processor, cause the IHS to:
        train a differential data link in a differential mode;
        train the differential data link in a first single-ended mode;
        train the differential data link in a second single-ended mode;

operate the differential data link in the first single-ended mode with a first set of optimization parameters;

monitor a performance characteristic of the differential data link in the first single-ended mode;

after operating the differential data link in the first single-ended mode and in response to a determination that the performance characteristic of the differential data link in the first single-ended mode is below a threshold, operate the differential data link in the second single-ended mode with a second set of optimization parameters;

monitor the performance characteristic of the differential data link in the second single-ended mode; and after operating the differential data link in the second single-ended mode and in response to a determination by the BIOS that the performance characteristic of the differential data link in the second single-ended mode is below the threshold, operate the differential data link in the differential mode with a third set of optimization parameters.

9. The IHS of claim 8, wherein to train the differential data link in the first and second single-ended modes, the program instructions, upon execution, further cause the IHS to:
train the differential data link in the first single-ended mode over a first conductor of a differential pair; and
train the differential data link in the second single-ended mode over a second conductor of the differential pair.

10. The IHS of claim 8, wherein the program instructions, upon execution, further cause the IHS to selectively operate the differential data link in the first single-ended mode or the second single-ended mode according to the monitored performance characteristic of the differential data link.

11. The IHS of claim 10, wherein the program instructions, upon execution, further cause the IHS to disable a transmission component associated with the second conductor in response to the differential data link being operated in the first single-ended mode, and to disable a transmission component associated with the first conductor in response to a determination that the differential data link is being operated in the second single-ended mode.

12. The IHS of claim 8, wherein the first, second, and third optimization parameters comprise: power or attenuation settings, line impedance matching settings, and filter settings.

13. The IHS of claim 8, wherein the training uses a test pattern that covers worst-case crosstalk, worst-case noise, or worst-case simultaneous switching.

14. The IHS of claim 8, wherein the threshold indicates error-free operation.

15. A computer storage device coupled to a processor of an Information Handling System (IHS), the computer storage device having program instructions stored thereon that, upon execution by the processor, cause the IHS to:
train a differential data link in a differential mode;
train the differential data link in a first single-ended mode;
train the differential data link in a second single-ended mode;
operate the differential data link in the first single-ended mode with a first set of optimization parameters;
monitor a performance characteristic of the differential data link in the first single-ended mode;
after operating the differential data link in the first single-ended mode and in response to a determination that the performance characteristic of the differential data link in the first single-ended mode is below a threshold, operate the differential data link in the second single-ended mode with a second set of optimization parameters;
monitor the performance characteristic of the differential data link in the second single-ended mode; and
after operating the differential data link in the second single-ended mode and in response to a determination by the BIOS that the performance characteristic of the differential data link in the second single-ended mode is below the threshold, operate the differential data link in the differential mode with a third set of optimization parameters.

16. The computer storage device of claim 15, wherein to train the differential data link in the first and second single-ended modes, the program instructions, upon execution, further cause the IHS to:
train the differential data link in the first single-ended mode over a first conductor of a differential pair; and
train the differential data link in the second single-ended mode over a second conductor of the differential pair.

17. The computer storage device of claim 15, wherein the program instructions, upon execution, further cause the IHS to selectively operate the differential data link in the first single-ended mode or the second single-ended mode according to the monitored performance characteristic of the differential data link.

18. The computer storage device of claim 17, wherein the program instructions, upon execution, further cause the IHS to disable a transmission component associated with the second conductor in response to the differential data link being operated in the first single-ended mode, and to disable a transmission component associated with the first conductor in response to a determination that the differential data link is being operated in the second single-ended mode.

19. The computer storage device of claim 15, wherein the first, second, and third optimization parameters comprise: power or attenuation settings, line impedance matching settings, and filter settings.

20. The computer storage device of claim 15, wherein the training uses a test pattern that covers worst-case crosstalk, worst-case noise, or worst-case simultaneous switching.

* * * * *